United States Patent Office 3,551,405
Patented Dec. 29, 1970

3,551,405
PROCESS FOR PRODUCING DESULFONATED LIGNIN RESINS
Dale W. Read, West Vancouver, British Columbia, Canada, assignor to Canadian International Paper Company, Montreal, Quebec, Canada, a corporation of Quebec
No Drawing. Filed Apr. 15, 1968, Ser. No. 721,208
Int. Cl. C07g 1/00; B32b 29/06
U.S. Cl. 260—124        6 Claims

ABSTRACT OF THE DISCLOSURE

The process of reacting a lignosulfonate-containing spent sulfite liquor, obtained from the sulfite pulping of wood products, with a caustic alkali in the presence of a miscible aliphatic alcohol and, optionally, salts of metals which form water-insoluble sulfides, to produce a desulfonated lignin resin. The thermosetting lignin resin thus obtained, when reacted with a phenol-formaldehyde resin, produces a resin which can be employed as a partial replacement for conventional phenolic resins in many applications where phenolic resins are normally employed.

The present invention relates to a process for treating the spent sulfite liquor obtained from the sulfite pulping of wood products, More particularly, it relates to a process for treating lignosulfonates contained in spent sulfite liquors and obtaining a thermosetting lignin resin which can be employed as a partial substitute or extender for conventional phenol-formaldehyde resins.

In the various pulping processes employed in the wood products industry, many materials of potential commercial importance are contained in the spent, or waste, liquors. Due to certain chemical and physical characteristics, many of these contained materials cannot be recovered economically and, accordingly, are disposed of by, for example, sewering. Notable among these are lignin materials.

A great amount of research has been directed to the economical recovery and commercial utilization of these lignin materials as a substitute for the conventional and more costly phenolic type resins. These research efforts have not, however, met with any appreciable degree of success. Yet, the utilization of lignin derived products as extenders or partial substitutes for phenol in phenol-formaldehyde resins could provide a large volume use for what is now largely a waste product. For, since lignin is phenolic in nature and is capable of undergoing condensation reactions with aldehydes, it could be used as a phenolic resin replacement.

Ordinary partially de-sugared, fermented and stripped mixed base softwood liquor, when evaporated to dryness and substituted for 55% to 85% of the phenol in phenol-formaldehyde resins, give laminates of good tensile strength and good internal bond. However, the water resistance of such products is so poor that they have proven unacceptable for ordinary commercial requirements. This poor water resistance can be ascribed partly to the presence of hydrophilic sulfonic acid groups on the lignin and partly to the presence of water-soluble carbohydrates and inorganic salts which are also contained in the waste liquor. Accordingly, it is believed, if the sulfonic acid groups were partially or completely removed from the lignosulfonates, the resulting lignin would (1) be rendered water-insoluble and acid-insoluble, which would facilitate its separation from the remaining acid-soluble components and (2) would yield a water-insoluble polymeric resin which when employed as a laminating agent would make the resulting laminated product highly resistant to water.

It is an object of the present invention to provide a process for treating lignosulfonate-containing spent sulfite liquors obtained from the sulfite pulping process, so as to recover therefrom a lignin resin.

It is another object of the present invention to provide a process for preparing a lignin resin from lignosulfonate-containing spent sulfite liquors, obtained from the sulfite pulping process, suitable as an extender for phenol-formaldehyde resins.

It is another object of the present invention to provide a thermosetting lignin-extended phenol-formaldehyde resin.

It is another object of the present invention to provide an economically advantageous process for preparing a thermosetting lignin resin suitable as an extender for phenol-formaldehyde resins.

Other and additional objects will become apparent hereinafter.

The above objects and other advantages are obtained by reacting a lignosulfonate-containing spent sulfite liquor, obtained as a by-product of the sulfite pulping process, with a caustic alkali in the presence of a partially or completely water-miscible lower aliphatic alcohol at elevated temperatures and pressures. Acidification of the resulting reaction mixture results in the recovery of a desulfonated, resinous, lignon product suitable as an extender or partial substitute for conventional thermosetting resins, such as phenol-formaldehyde resins, which are useful in laminating or molding applications. It has been found that the combined use of a caustic alkali and a water-misclible lower aliphaitc alcohol in the process of the present invention has the substantial advantage of measurably reducing the caustic alkali requirement in the production therewith of a commercially acceptable laminate having heightened water resistance.

Treatment of lignosulfonates with caustic alkali at elevated temperatures is known to produce a desulfonated product. However, the highly condensed product which is obtained, when used to extend phenol-formaldehyde resins, generally produces laminating resins of poor quality. By contrast, the use of an alcohol in accordance with the present invention improves the laminating quality of the resulting resins. The reason for the beneficial effect of the alcohol is not known with any degree of certainty. It is postulated, however, that there is a chemical interaction between the alcohol and the lignin which prevents excessive condensation.

The present invention can be practiced with the spent liquor obtained from various wood pulping processes, wherein the spent liquor contains in solution lignin material in the form of a partially or completely sulfonated lignin. However, it is preferred to employ a lignosulfonate-containing spent liquor obtained from the sulfite pulping process. The spent sulfite liquors from various types of sulfite pulping such as calcium-base acid sulfite pulping, ammonia-base acid sulfite pulping, magnesium-base acid sulfite pulping, sodium-base acid sulfite pulping, etc., may be utilized. It is preferred to employ an unconcentrated spent sulfite liquor having a solids content of from about 10% to about 15%. Approximately 60% to 65% of the solids content is lignosulfonate material.

The particular aqueous caustic alkali employed can be selected from among any of the well-known alkali metal hydroxides, exemplary of which are calcium hydoxide, sodium hydroxide, potassium hydroxide, magnesium hydroxide, etc. Although any of the aqueous alkalis mentioned above can be employed, as well as other alkalis not recited, it is preferred to employ sodium hydroxide. When the spent sulfite liquor is heated with the sodium hydroxide, in the presence of the alcohol, the amount of sodium hydroxide employed can be from about 30 grams to about 80 grams per liter of spent sulfite liquor. It is preferred that the amount of sodium hydroxide employed be from about 30 grams to about 60 grams per liter of spent sulfite liquor.

The alcohol employed must be miscible with water. Thus, the preferred class of alcohols are the lower aliphatic alcohols which are infinitely miscible with water. Accordingly, the alcohols preferred for utilization in the instant invention are methanol, ethanol, denatured ethanol, n-propanol, isopropanol and mixtures thereof. As a matter of practical convenience and economy, denatured ethanol is especially preferred. The range of concentration of the alcohol can be from about 0.25 to about 2.0 liters per liter of spent sulfite liquor. The preferred alcohol concentration is about 1 liter per liter of spent sulfite liquor. The lower range of alcohol concentration is governed in part by the amount of caustic used; the lower the caustic concentration, the higher the alcohol concentration that is required. The upper range of alcohol concentration is governed largely by economics. In addition, the higher the alcohol concentration, the greater will be the tendency to produce unwanted low molecular weight materials, such as phenols.

The reaction can be carried out at a temperature of from about 200° C. to about 275° C. It is preferred that the reaction be carried out at a temperature of about 250° C. The range of pressures employed can be from about 50 p.s.i. to about 1000 p.s.i. A preferred pressure range is from about 300 p.s.i. to about 900 p.s.i The reaction time can be from about five minutes to about sixty minutes, with a reaction time of ten minutes being preferred The reaction mixture after being allowed to cool, can be distilled under reduced pressure or evaporated to half volume to remove and recover the alcohol. The reaction mixture is then acidified to a pH of about 2 with a strong mineral acid, such as sulfuric acid or hydrochloric acid, or with sulfur dioxide (sulfurous acid), in order to precipitate the lignin resin.

After drying, the resulting desulfonated lignin resin is employed to extend a standard phenol-formaldehyde type laminating resin in which from about 65% to about 85% of the phenol in the phenol-formaldehyde resin is replaced by lignin. Thus, the ratio of lignin to phenol in the lignin extended phenol-formaldehyde resin is from about 65:35 to about 85:15.

A modification of the lignin resin preparation process hereinbefore described has been discovered which involves the addition of a water-soluble metal salt to the previously mentioned reactants, namely the caustic alkali and the miscible lower aliphatic alcohols. The addition of the metal salt reduces the cost of preparing the lignin resin by: (1) lowering the concentration of caustic required for the reaction, e.g., from about 30 to about 60 grams of sodium hydroxide down to about 15 to 20 grams of sodium hydroxide per liter of spent sulfite liquor, (2) reducing the amount of acid required to acidify the reaction mixture and precipitate the lignin product, and (3) generally resulting in higher yields than were obtained at higher caustic concentration where no metal salt was added. It is postulated, although it is not known with any degree of certainty, that the metal salts form water-insoluble sulfides, which reduce the tendency of the lignin to become demethylated and, therefore, to condense excessively.

The modification of the process, referred to above, comprehends the use of a water-soluble salt of a metal. The metal can be selected from the groups of the Periodic Table consisting of Groups I–B, II–B, IV–B, VI–B, VII–B and VIII. The preferred metals are copper, cadmium, nickel, manganese, zinc, iron and titanium. Zinc and manganese are especially preferred in the practice of the present invention. Exemplary of the metal salts which may be employed, but not limited thereto, are: cupric acetate, cupric sulfate, cobaltous sulfate, cadmium sulfate, cadmium chloride, nickel chloride, manganous acetate, zinc acetate, zinc chloride, chromium acetate, titanium sulfate, nickel sulfate, manganous chloride, manganous sulfate, ferrous sulfate, etc. The preferred metal salts are zinc acetate and manganous sulfate. The metal salts can be used in amounts from about 0.5 gram to about 20 grams. The preferred range is from about 1 gram to about 10 grams of the metal salt per liter of spent sulfite liquor.

Although it is preferred to employ the desulfonated lignin resin prepared in accordance with the present invention, to extend a phenol-formaldehyde resin, it can also be employed to extend other thermosetting compositions, such as urea-formaldehyde and melamine-formaldehyde resins. The phenol-formaldehydre resin is prepared, as is well-known and conventional in the art, by reacting 36% aqueous formaldehyde with phenol in the presence of a basic catalyst, such as ammonia or sodium hydroxide.

The process of the present invention will be readily understood from a consideration of the following example and the tabular compilation of experiments which are presented for the purpose of illustration only and are not intended to limit the scope of the invention in any way.

EXAMPLE 1

(a) Preparation of lignin resin

In each of the experiments found tabulated below in Tables 1 and 2, one liter of standard denatured ethyl alcohol and one liter of a calcium-based spent sulfite liquor were added to a one gallon autoclave. In each of the experiments tabulated in Table 1, sodium hydroxide was also added, in the amount indicated in the table. In the experiments tabulated in Table 2, sodium hydroxide and a metal salt were also added in each experiment in the amounts indicated in the table. After the addition of the reactants, the reaction proceeded at the temperature indicated in the tables for a period of ten (10) minutes with continuous agitation of the autoclave contents.

The reaction mixture after being allowed to cool was evaporated to half volume. Then, the mixture was acidified with hydrochloric acid to precipitate the desulfonated lignin resin from solution. The isolated lignin product was then dried. The lignin yields obtained in each experiment are indicated in Tables 1 and 2.

(b) Preparation of the partially condensed phenol-formaldehyde resin

The partially condensed phenol-formaldehyde resin was prepared by adding to a round botton flask 376 grams of phenol, 420 mls. of 36% aqueous formaldehyde, and 3.2 grams of sodium hydroxide in 20 mls. of water. The flask was fitted with a reflux condenser and placed in a wax bath previously heated to 120° C. With the bath temperature maintained at this level, the reaction was allowed to proceed for 45 minutes after the start of reflux. The flask was then cooled rapidly.

(c) Preparation of a lignin extended phenol-formaldehyde resin and its use as a laminating agent The lignin extended phenol-formaldehyde resin was prepared by dissolving 7.7 grams of the phenol-formaldehyde resin and 20.4 grams of the lignin resin, the preparation of said resins having been described in (a) and (b), supra, respectively, in 72 mls. of a 3:1 mixture of ethyl alcohol and water. The solution was refluxed for 30 minutes and then cooled rapidly to room temperature. Eighteen sheets of kraft laminating paper (2″ x 6″) were dipped in the lignin extended phenol-formaldehyde resin and hung up to dry for 24 hours.

The dried sheets were stacked and the stack was wrapped in aluminum foil and pressed at 1250 p.s.i. and 150° C. for 30 minutes. After the metal platens of the press had cooled to approximately room temperature, the pressure was released and the laminate was removed. The resulting laminate is a laminated hardboard of the Formica® or Arborite® type, which is employed in the manufacture of counter tops in which a high degree of water resistance is necessary. The laminating properties are indicated in Tables 1 and 2.

TABLE 1.—LIGNIN LAMINATING RESINS PREPARED BY ALKALINE TREATMENT OF SPENT SULFITE LIQUOR IN THE PRESENCE OF ALCOHOL

| Experiment No. | Reaction temperature, °C. | Pressure, p.s.i. | NaOH added, g./l. | Lignin yield, g./l. | Laminate properties ||||| Water resistance |||
|---|---|---|---|---|---|---|---|---|---|---|---|---|
| | | | | | Lignin phenol ratio | Resin content, percent | M.O.R., lb./in.$^2$ | M.O.E., lb./in.$^2$ | Internal bond, lb./in.$^2$ | Barcol hardness | Weight increase, percent | Thickness increase percent |
| 1 | 200 | 325 | 30 | 25 | 85:15 | 45 | <2,000 | | 140 | 20 | 27.6 | 14.5 |
| 2 | 200 | 325 | 50 | 45 | 85:15 | 40 | 13,000 | 1,730,000 | 370 | 52 | 8.0 | 5.3 |
| 3 | 225 | 525 | 30 | 26 | 85:15 | 50 | 6,100 | | 260 | 45 | 7.8 | 3.3 |
| 4 | 225 | 550 | 50 | 48 | 85:15 | 44 | 22,000 | 3,030,000 | 380 | 55 | 9.1 | 5.3 |
| 5 | 250 | 850 | 20 | 67 | (Lignin insoluble in alcohol/water) |||||||| 
| 6 | 250 | 850 | 30 | 42 | 85:15 | 47 | 11,000 | 2,080,000 | 340 | 57 | 8.6 | 7.7 |
| 7 | 250 | 850 | 40 | 42 | 85:15 | 40 | 24,000 | 2,700,000 | 400+ | 55 | 10.4 | 10.6 |
| 8 | 250 | 825 | 60 | 48 | 85:15 | 45 | 19,000 | 2,200,000 | 300 | 57 | 5.8 | 4.2 |
| 9 | 250 | 850 | 30 | 42 | 80:20 | 44 | 29,000 | 2,130,000 | 260 | 55 | 7.6 | 5.6 |
| 10 | 250 | 850 | 30 | 42 | 75:25 | 40 | 27,000 | 2,480,000 | 480+ | 55 | 3.8 | 3.7 |
| 11 | 250 | 850 | 30 | 42 | 67:33 | 39 | 27,000 | 2,250,000 | 340+ | 58 | 3.1 | 1.9 |

NOTE. In all cases, the reaction time was ten minutes at the reaction temperature.

TABLE 2.—LIGNIN LAMINATING RESINS PREPARED BY ALKALINE TREATMENT OF SPENT SULFITE LIQUOR IN THE PRESENCE OF ALCOHOL AND METAL SALTS

| Experiment No. | Reaction temperature, °C. | Pressure, p.s.i. | NaOH added, g./l. | Metal salt added, g./l. | Lignin yield g./l. |
|---|---|---|---|---|---|
| 1 | 250 | 850 | 15 | Copper sulphate; 8 | 61 |
| 2 | 250 | 850 | 15 | Ferrous sulphate; 4 | 56 |
| 3 | 250 | 825 | 20 | Ferrous sulphate; 2 | 54 |
| 4 | 250 | 800 | 15 | Manganous sulphate; 6 | 59 |
| 5 | 250 | 800 | 20 | Manganous sulphate; 2 | 49 |
| 6 | 250 | 850 | 15 | Cadmium sulphate; 4 | 56 |
| 7 | 250 | 850 | 15 | Manganous acetate; 4 | 51 |
| 8 | 250 | 850 | 15 | Nickel chloride; 4 | 57 |
| 9 | 250 | 850 | 15 | Titanium sulphate; 4 | 50 |
| 10 | 250 | 830 | 15 | Zinc acetate; 4 | 48 |

| Experiment No. | Laminate properties |||| Water resistance ||
|---|---|---|---|---|---|---|
| | Resin content, percent [1] | M.O.R lb./in.$^2$ | M.O.E lb./in.$^2$ | Internal bond lb./in.$^2$ | Barco hardness | Weight increase, percent | Thickness increase, percent |
| 1 | 42 | 20,000 | 2,020,000 | 230+ | 50 | 9.3 | 3.8 |
| 2 | 43 | 23,000 | 3,110,000 | 230+ | 50 | 9.5 | 2.7 |
| 3 | 46 | 11,000 | 2,600,000 | 400 | 60 | 9.7 | 8.8 |
| 4 | 39 | 21,000 | 4,500,000 | 350 | 60 | 18.3 | 16.8 |
| 5 | 44 | 12,000 | 2,650,000 | 540+ | 57 | 11.6 | 8.3 |
| 6 | 38 | 25,000 | 1,850,000 | 310 | 55 | 20.3 | 14.3 |
| 7 | 37 | 11,000 | 1,440,000 | 290 | 50 | 20.0 | 13.6 |
| 8 | 38 | 25,000 | 2,110,000 | 250 | 57 | 13.7 | 7.5 |
| 9 | 36 | 24,000 | 1,750,000 | 410 | 52 | 9.6 | 11.1 |
| 10 | 36 | 25,000 | 1,850,000 | 420 | 53 | 8.1 | 5.6 |

[1] The lignin to phenol ratio was 85:15 in all cases.

NOTE.—In all cases, the reaction time was ten minutes at the reaction temperature.

What is claimed is:

1. Process for preparing a material suitable as an extender for a thermosetting resin which comprises the steps of:
   (a) reacting a lignosulfonate-containing spent sulfite liquor with from about 30 to about 60 grams of a caustic alkali per liter of said spent sulfite liquor at a temperature of from about 200° C. to about 275° C. and a pressure of from about 300 p.s.i. to about 900 p.s.i. for a period of from about 5 minutes to about 60 minutes in the presence of from about 0.25 to about 2.0 liters of an infinitely water-miscible lower aliphatic alcohol per liter of said spent sulfite liquor, said alcohol being selected from the group consisting of methanol, ethanol, n-propanol, isopropanol and mixtures thereof, and in the presence of from about 0.5 gram to about 20 grams of a water-soluble metal salt per liter of said spent sulfite liquor, said metal being selected from the group consisting of copper, iron, manganese, cadmium, nickel, titanium and zinc;
   (b) acidifying the reaction mixture; and
   (c) recovering therefrom a desulfonated lignin resin as a precipitate.

2. The process as recited in claim 1 wherein said caustic alkali is selected from the group consisting of sodium hydroxide, potassium hydroxide and calcium hydroxide.

3. The process as recited in claim 1 wherein the reaction is carried out at a temperature of from about 200° C. to about 275° C. and a pressure of from about 300 p.s.i. to about 900 p.s.i. for a period of from about 5 minutes to about 60 minutes in the presence of from about 30 grams to about 60 grams of sodium hydroxide per liter of said spent sulfite liquor and from about 0.25 to about 2.0 liters of ethanol per liter of said spent sulfite liquor.

4. The process as recited in claim 1 wherein the amount of said metal salt is from about 1 gram to about 10 grams per liter of said spent sulfite liquor and the amount of said caustic alkali is from about 15 grams to about 20 grams per liter of said spent sulfite liquor.

5. The process as recited in claim 4 wherein said metal salt is zinc acetate.

6. The process as recited in claim 4 wherein said metal salt is manganous sulfate.

References Cited

UNITED STATES PATENTS 2,037,001  4/1936  Aronovsky _____ 92—9
2,683,706  5/1950  Müller _____ 260—124
2,802,815  8/1957  Doughty _____ 260—124

OTHER REFERENCES

Hägglund: "Chemistry of Wood," (1951) pp. 237–38.

CHARLES B. PARKER, Primary Examiner

D. R. PHILLIPS, Assistant Examiner

U.S. Cl. X.R.

117—68.5; 161—270; 260—17.5